United States Patent Office 3,227,572
Patented Jan. 4, 1966

3,227,572
PIPE REPAIR PROCESS
Victor A. Rundle, Oakland, and Carl E. Watson, Richmond, Calif., assignors to Chevron Research Company
No Drawing. Filed June 6, 1962, Ser. No. 200,352
5 Claims. (Cl. 117—2)

This invention is a continuation-in-part of patent application Serial No. 106,157, filed April 28, 1961, now abandoned.

This invention relates to a process for repairing leaky water-carrying pipes. More particularly, this invention is directed to a process of inhibiting leakage in water-carrying pipes such as sewer pipes and irrigation water pipes; that is, a process of inhibiting the flow of water through the walls of ceramic and cement pipes.

This invention has practical applications for repairing leaks in ceramic and concrete pipes used in carrying water for the irrigation of farm lands, sewer pipes, and wherever it is desirable to stop the passage of water through the walls of water-carrying pipes.

Repairing cracks and leaks in water-carrying pipes, for example, sewer pipes, is an expensive and time-consuming operation. It is the usual procedure to remove the soil, rocks, or other material surrounding the leaking sewer pipe section and patch the cracks, if possible, or remove the cracked pipe completely and replace it with a new section of pipe. In larger pipes, repair men actually crawl inside the pipes and coat cracks with materials such as epoxy resins and asphalt mastics. All of this is avoided by the use of the process described hereinbelow.

The main purposes for the process described herein are to repair leaks in (1) pipes carrying water to irrigation waterways, and (2) sewer pipes.

Water is transported freely in earth canals to irrigate crops, to supply water for cattle, etc. It is well known that large amounts of water are lost through leakage from the concrete pipes leading to such irrigation systems.

When sewer pipes become cracked, the sewage water can escape into the surrounding soil to create a sanitation problem. On the other hand, if the pressure of the water in the soil surrounding the sewer pipe is sufficiently great, the water moves into the sewer pipe. In this latter case, the excess amount of water in the sewer pipe overburdens the facilities of the sewage disposal plant, making it extremely difficult to process the sewage properly.

Although the above emphasizes the use of the process described herein primarily for the repair of leaking pipes used to transport sewage and water for irrigation purposes, the process herein is not so limited. The described process is applicable in the repair of leaks in any buried ceramic and concrete pipes which carry water as such, or carry aqueous dispersions or slurries.

Numerous functional requirements must be met by sealants useful for repairing leaks in pipes which transport water for irrigation purposes. In order to reduce the loss of water, particularly in the West where water is so difficult to obtain, it is desirable to reduce the loss of water from water-carrying pipes. The material which is used to inhibit the leakage must be non-toxic to humans, animals and crops. Also, weather conditions such as freezing or thawing, must not affect the sealant.

It is a primary object of this invention to describe an effective and inexpensive process by which cracks and breaks in ceramic pipes and concrete water-carrying pipes are sealed without entering the pipes, without removing any material from around the pipes, and without replacing the cracked pipe with a new pipe.

In accordance with this invention, it has been discovered that water seepage through cracked porous pipes can be inhibited by a process whereby aqueous wax dispersions are caused to enter into cracked sections of pipe. The dispersion penetrates the crack in the pipe; the dispersion breaks, and a seal is formed to inhibit the flowing water through the wall of the pipe.

In the consideration of "pipes" herein, the term "pipes" refers only to those sections of water-carrying pipes which are buried in soil. Although such pipes may be wholly or partially covered by soil, the process described herein is advantageously used to stop leaks in those pipe sections which are covered by soil. Whenever a leak occurs in an uncovered section of a water-carrying ceramic or cement pipe, it is obviously more advantageous to repair the leak by means other than that described herein.

Waxes which can be used herein in the formation of aqueous wax dispersions include petroleum paraffin waxes having average melting points in the range of 100° F. to 190° F. A.M.P. (the term "A.M.P." refers to American melting point, as defined in ASTM D–87–42). Particularly effective waxes are the paraffin waxes having melting points in the range of 125° F. to 165° F. A.M.P., including particularly waxes having melting points in the range of 125° F. to 130° F. A.M.P. This encompasses materials containing waxes, such as waxy distillates, etc.

In the formation of wax dispersions which effectively form wax seals, it is desirable that the wax particles which are dispersed in the aqueous medium have a particle size no greater than 5 microns. In order that the wax seal may be formed in minute spaces, it is preferred that the wax particle size in the wax emulsion is from 0.1 to 2.5 microns.

In the preparation of such aqueous dispersions of finely divided paraffin wax particles, it is necessary to use a dispersing agent.

Examples of dispersing agents which can be used herein in the formation of stable aqueous dispersions of wax particles useful as pipe sealants are as follows:

Cation active compounds which can be used include the salts of quaternary ammonium bases, and primary, secondary and tertiary amines, all of which may be aliphatic, alicyclic, aromatic or mixed, and which may contain substituents such as chlorine, hydroxyl, ether, esters, etc.

Cationic dispersing agents can be exemplified by the chloride, nitrate, sulfate, etc. salts of paraffin wax amines, monoalkylamines, such as laurylamine, myristylamine, cetylamine, etc.; secondary amines such as methylcetyl amine, ethylstearyl amine, laurylstearyl amines, etc.; quaternary bases such as trimethylcetyl ammonium hydroxide, dimethylphenylstearyl ammonium hydroxide, etc.

Nonionic dispersing agents include fatty acid-alkanolamine condensates; ethylene oxide-fatty acid condensates; alkyl, aryl polyether alcohols; ethylene oxide-fatty alcohol condensates, polyoxyethylene thioethers, polypropylene glycol-ethylene oxide condensates, etc. The polyoxyethylene derivative of sorbitan monopalmitate is a particularly effective nonionic dispersant.

Anionic dispersing agents include the salts of sulfated alcohols, for example, the alkali metal salts of sulfated lauryl alcohol, sulfated cetyl alcohol, stearyl alcohol, etc.; the alkali metal salts of sulfated oils, such as sulfated castor oil, etc.; the numerous sulfonates, for example, metal salts of petroleum sulfonic acids, metal salts of sulfonated amides, metal salts of sulfonated ethers, metal salts of alkyl, aryl sulfonic acids, etc.; alkali metal salts of fatty acids, for example, sodium oleate; metal salts of high molecular weight alkane phosphonic acids, partial esters of phosphoric acids, naphthenic acids, etc. In place of the metal salts hereinabove, low molecular weight ammonia derivatives are included, for example, ammonium salts, amine salts, etc., as exemplified by triethanolamine oleate, triethanolamine stearate, etc.

Amphoteric dispersing agents are exemplified as follows: $C_8$–$C_{24}$-alkylamine carboxylic acids and their water-soluble salts, such as N-dodecyl-$\beta$-imino-propionic acid; N-substituted amino acid derivatives obtained by condensation of fatty primary amines and acrylic monomers, including those sold to the trade under the generic name of "Deriphats" by the Chemical Division of General Mills, Inc., for example, N-fatty-$\beta$-aminopropionates, such as Deriphat 151 and Deriphat 170C.

The dispersing agents are used in amounts of 0.001% to 0.1%, by weight, in the aqueous wax dispersions which are used to seal leaking pipes.

The wax content of aqueous dispersion useful herein can range from 0.02% to 5%, by weight, preferably from 0.2% to 2%, by weight.

The following examples illustrate the preparation of aqueous wax dispersions useful herein for sealing cracks in pipes.

EXAMPLE I

Mixture A was prepared by blending 2.5 grams of Carbopol 934 (a vinyl polymer having active carboxyl groups—a product of B. F. Goodrich Chemical Co.) and 2120 grams of water with violent agitation for a period of 30 minutes at ambient temperature, after which there was added 12.5 grams of a polyoxyethylene derivative of sorbitan monopalmitate sold as Tween 40 by the Atlas Chemical Co., and 3.4 grams of triethanolamine, and the resulting mixture was heated to a temperature of 200° F.

Mixture B was prepared by blending 12.5 grams of oleic acid and 350 grams of petroleum paraffin wax having a melting point range of 125–130° F. A.M.P., and heating to a temperature of 200° F.

Mixture B was slowly added to Mixture A at 200° F. with violent agitation, and subsequent milling in a Manton-Gaulin homogenizer at 2000–3000 p.s.i., resulting in an aqueous wax dispersion concentrate useful according to the process described herein.

EXAMPLE II

Mixture A was prepared by blending 12.5 grams of Tween 40, 3.4 grams of triethanolamine, 2.5 grams of Carbopol 934, and 2120 grams of water at 200° F. with agitation.

Mixture B was prepared by blending 175 grams of paraffin wax having a melting point range of 125–130° F. A.M.P., 175 grams of a waxy residuum from slack wax having a melting point range of 155–177° F. and 12.5 grams of oleic acid by heating to 200° F. with agitation.

Mixture B was slowly poured into Mixture A with violent agitation at 200° F., and subsequent milling in a Manton-Gaulin homogenizer at 2000–3000 p.s.i. The resulting dispersion served as a concentrate for the process described herein.

EXAMPLE III

Mixture A was prepared by blending 2120 grams of water, 3.4 grams of triethanolamine, 12.5 grams of Tween 40, and 2.5 grams of Carbopol 934 at 200° F.

Mixture B was prepared by blending 350 grams of a waxy distillate from a Minas crude, and 12.5 grams of oleic acid with agitation at 200° F.

Mixture B was slowly poured into Mixture A with violent agitation at 200° F., and subsequent milling in a Manton-Gaulin homogenizer at 2000–3000 p.s.i. to form the desired wax dispersion.

EXAMPLE IV

Mixture A was prepared by blending 1950 grams of water and 50 grams of N-lauryl-$\beta$-aminopropionic acid at 200° F. with agitation.

Mixture B was prepared by heating 975 grams of water and 500 grams of petroleum wax having a melting point range of 125–130° F. A.M.P. to 200° F. with agitation.

Mixture B was slowly poured into mixture A with violent agitation at 200° F., and subsequent milling in a Manton-Gaulin homogenizer at 2000–3000 p.s.i. resulting in the formation of an aqueous wax dispersion.

EXAMPLE V

An aqueous wax dispersion having a solids content of 0.2%, by weight, was prepared from a petroleum wax having a melting pont of 125° F. to 130° F. A.M.P., using Arquad T–50 as a cationic dispersing agent. Arquad T–50, a product of the Chemical Division, Armour Company, is an organo trimethyl quaternary ammonium chloride wherein the organo radical consists of a mixture of the following hydrocarbon radicals: tetradecyl–3%, hexadecyl–27%, octadecyl–16%, octadecenyl–48%, and octadecadienyl–6%.

The dispersions prepared as concentrates according to the examples set forth hereinabove were diluted with water to form an aqueous wax dispersion having the desired wax content. This dilution of the concentrate may be accomplished by simply adding water to the concentrate, and the diluted dispersion used to seal the cracks of pipes. On the other hand, the concentrate itself may be poured into a water already in the pipes so that the desired concentration of the wax is obtained by dilution with the water in the pipe itself.

Rather than transport large amounts of water as a part of the aqueous wax dispersion used according to the process described herein, concentrates of the components may be formed in the following percentage ranges.

| Composition: | Percent by weight |
|---|---|
| Wax component | 14–50 |
| Dispersing agent | 0.4–6.0 |
| Water | 44–85.6 |

In the preparation of the concentrates of aqueous wax emulsion, the emulsion is normally formed by heating the components with agitation to temperatures in excess of the melting point of the wax. Once the aqueous wax emulsion has been prepared at such temperatures, it is preferred to maintain the emulsion at temperatures in excess of 100° F., still more preferably at temperatures in excess of the melting point of the wax, but normally in excess of 125° F., until the concentrate is diluted at the site where the water-resistant membrane is to be formed. In some cases, the aqueous wax emulsion concentrate may be kept at temperatures as low as room temperature prior to dilution for use; however, higher temperatures are preferred.

The process described herein for inhibiting leaks in water-carrying pipes was evaluated by using the following wax dispersion concentrate.

The wax was a petroleum wax having a melting point range of 125° F. to 130° F. A.M.P.

*Table I*

| Composition: | Weight percent |
|---|---|
| (1) Wax | 28.000 |
| (2) Tween 40 (identified hereinabove) | 1.000 |
| (3) Oleic acid | 1.000 |
| (4) Triethanolamine | 0.135 |
| (5) Carbopol 934 (identified hereinabove) | 0.100 |
| (6) Water | 69.765 |

The effectiveness of the wax dispersion described herein in reducing leakage in pipes is described in the examples set forth hereinbelow.

EXAMPLE VI

The amount of water leaking through cracks in a 24 inch diameter, 600 feet long buried concrete pipe was determined by measuring the water drop in a 36 inch standpipe. The distance from the top of the standpipe to the bottom of the buried pipe was 11 feet. The leakage rate was 1.2 feet per hour; that is, the level of the water in the 36 inch standpipe dropped 1.2 feet per hour.

A well pump supplied water to the buried pipe at a rate of 2690 gallons per minute. 100 gallons of the aqueous wax dispersion of Table I hereinabove was added at a rate of 5 gallons every 15 seconds. At this rate, the 600 feet section of pipe was filled in 5 minutes and the solid concentration of the resulting diluted dispersion was 0.22% by weight.

One hour after the final addition of the wax dispersion concentrate, the water level in the standpipe had dropped only 0.2 foot (as opposed to the pretreatment drop of 1.2 per hour). One week after the treatment, the water level in the standpipe dropped 0.25 foot in 24 hours (an average of 0.01 foot per hour), which was a reduction in leakage of 99.2%.

EXAMPLE VII

A 30 inch diameter, 4000 feet long irrigation pipe was leaking at the rate of 57 cubic feet (430 gallons) per hour, as measured by the water level drop in the distribution box. One hundred and twenty-five gallons of an aqueous wax dispersion having the composition shown in Table I hereinabove was added at the rate of 1.4 gallons per minute.

The water flow into the pipe line was at a rate of 1700 gallons per minute. Thus, the final solids content was 0.02%, by weight.

Eleven days after the treatment, the leakage from this pipe was only 4.8 cubic feet per hour (a reduction in leakage of 92%.

EXAMPLE VIII

A section of a city sewer pipe six inches in diameter and 750 feet long into which ground water was continually flowing was treated with sufficient aqueous wax dispersion of the composition of Table I hereinabove to give a final solids concentration of 2.5% by weight. The ground water which had been flowing into this city sewer pipe eventually overloaded the city sewage disposal plant. After the aqueous wax dispersion had been left in the pipe for four hours, it was determined that the water leakage had been reduced by 80%.

We claim:

1. Process for reducing the leakage in buried water-carrying ceramic and concrete pipe, which comprises introducing into water contained in said pipe an aqueous wax dispersion having particle sizes of no greater than 5 microns, whereby said wax dispersion escapes through the openings in said pipe into the surrounding soil and collapses in said soil to form a seal against further leakage.

2. Process for reducing leakage in buried water-carrying ceramic and concrete pipe, which comprises mixing an aqueous dispersion of finely divided wax particles stabilized by a dispersing agent with water flowing in said pipe to form an aqueous dispersion comprising from 0.001% to 0.1%, by weight, of a dispersing agent, from 0.02% to 5%, by weight, of wax particles having sizes no greater than 5 microns, and water to provide the balance of the 100% aforesaid dispersion, whereby the aqueous wax dispersion escapes through the openings in said pipe into the surrounding soil and collapses in said soil to form a seal against further leakage.

3. A process according to claim 2, wherein said wax particles are of a size in the range of 0.1 to 5 microns.

4. A process according to claim 2, wherein said wax is a petroleum paraffin wax having a melting point range of 125° F. to 165° F. A.M.P.

5. A process according to claim 2, wherein said wax is a petroleum paraffin wax having a melting point range of 125° F. to 130° F. A.M.P.

References Cited by the Examiner
UNITED STATES PATENTS

| | | |
|---|---|---|
| 1,636,367 | 7/1927 | Illemann. |
| 1,904,576 | 4/1933 | Twiss et al. _____ 117—95 X |
| 2,158,025 | 5/1939 | Van Hulst et al. _____ 61—36 |
| 2,950,702 | 8/1960 | Ferguson et al. _____ 117—95 X |
| 3,108,441 | 10/1963 | Watson _____ 61—36 |

RICHARD D. NEVIUS, *Primary Examiner.*